US 6,594,150 B2
Jul. 15, 2003

(12) United States Patent
Creason et al.

(10) Patent No.: US 6,594,150 B2
(45) Date of Patent: Jul. 15, 2003

(54) COMPUTER SYSTEM HAVING FRONT AND REAR CABLE ACCESS

(75) Inventors: Richard Creason, Palo Alto, CA (US); Clifford B. Willis, Tracy, CA (US); Denise Silverman, San Carlos, CA (US); Michael Sean White, San Jose, CA (US); David M. Arstein, Scotts Valley, CA (US); Victor E. JoChiong, Mill Valley, CA (US); Timothy E. Mautz, San Francisco, CA (US); Steve M. Wilson, San Jose, CA (US); Raymond Kai Ho, San Jose, CA (US); Kaamel Kermaani, Cupertino, CA (US); Carl Meert, Sunnyvale, CA (US); Adiymar Bigio, Scotts Valley, CA (US); Vince Hileman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/776,455

(22) Filed: Feb. 2, 2001

(65) Prior Publication Data

US 2002/0012232 A1 Jan. 31, 2002

Related U.S. Application Data

(60) Provisional application No. 60/179,734, filed on Feb. 2, 2000.

(51) Int. Cl.[7] ................................................ H05K 1/14
(52) U.S. Cl. ........................ 361/727; 361/679; 345/503; 439/61
(58) Field of Search ................................. 361/727, 683, 361/726, 679, 784; 710/309–313; 345/503, 519; 439/61

(56) References Cited

U.S. PATENT DOCUMENTS

| | | | | |
|---|---|---|---|---|
| 5,822,184 A | * | 10/1998 | Rabinovitz | 361/685 |
| 6,046,912 A | * | 4/2000 | Leman | 361/784 |
| 6,091,609 A | * | 7/2000 | Hutson et al. | 361/794 |
| 6,288,894 B1 | * | 9/2001 | Schmitt | 361/683 |
| 6,297,962 B1 | * | 10/2001 | Johnson et al. | 361/726 |
| 6,325,636 B1 | * | 12/2001 | Hipp et al. | 439/61 |

* cited by examiner

Primary Examiner—Darren Schuberg
Assistant Examiner—Hung Van Duong
(74) Attorney, Agent, or Firm—Park, Vaughan & Fleming LLP

(57) ABSTRACT

A computer system comprising a chassis and housing removable servers supported in subchassis, each chassis having optional front or read cable access. Power and signal connectivity to the servers may be made from the front or rear of the system. The subchassis may be half the width of the chassis or a quarter of a width of the chassis. The subchassis further include an upper bay and a lower bay as well as a plurality of field replaceable units, which all may be access through the front of the chassis. One or more of the field replaceable units connect to the system through a midplane, located within the subchassis.

34 Claims, 7 Drawing Sheets

COMPUTER SYSTEM HAVING FRONT AND REAR CABLE ACCESS

CROSS REFERENCE TO RELATED APPLICATIONS

This application claims priority to provisional application Serial No. 60/179,734 filed Feb. 2, 2000.

BACKGROUND OF THE INVENTION

1. Field of the Invention

The present invention relates to computer systems having field replaceable units, and more particularly, to a computer system having field replaceable units where signal and power connectivity can be established through the front or the back of the computer system.

2. Description of the Related Art

With the rapid growth and use of the world wide web, service providers such as telecommunications companies (telecoms) and internet service providers (ISPs) are experiencing rapid growth in the size of their data processing operations, while having to meet the high availability demands of the internet users. In this market, space is at a premium and system uptime is critical. Computer systems, often referred to as servers, need to meet the requirements of high performance, high availability, low profile systems at a competitive price.

Industry wide organizations have attempted to address some of these issues by adopting standards to make components interchangeable with ease. One of these standards is the peripheral component interconnect standard or PCI standard. The PCI standard is an industry standard which provides a high performance local bus architecture at a low cost. It is intended to be a common I/O component interface across different platforms. The PCI bus is not truly a local bus (i.e. One which enables data transfer between the processor and memory/cache subsystems) but is instead an intermediate bus which is coupled to the processor by a PCI bridge controller. Data can be transferred to the devices on the PCI bus through the bridge controller, which typically buffers the data and allows the processor to perform other tasks while the data is transferred to the target device at the most efficient rate possible.

Compact PCI or cPCI is another industry standard which is related to PCI. Compact PCI is a combination of several well developed technologies, including PCI bus technology, Eurocard mechanical technology (e.g. As used in VME bus systems), and a pin and socket connector technology. The combination of these technologies results in a rugged, reliable package for PCI devices.

The compact PCI standard also provides for several levels of hot swapping. Hot swapping refers to the installing or removing devices from a computer while the computer is operating. Hot swapping is useful because it allows components to be replaced or upgraded without necessitating any downtime in the system. This is particularly important in applications such as network servers, routers, voice mail servers and other systems that must be online all the time.

While the importance of ruggedizing individual system components is readily understood, it is similarly as important that the system in which these components are installed is likewise as robust. No matter how rugged the devices are, or how efficient the hot swapping methodology is, unless the system in which they are installed is rugged and highly available, the components will not work.

A server designed to the compact PCI standard must be as rugged as the individual components, and for the greatest market penetration, should be designed for deployment in the U.S., European and Asian markets. Consumers such as telecoms and ISPs further have high availability requirements of such a system. Customer requirements can further vary greatly. Many applications are compute intensive and many applications are I/O intensive. In some applications, the customer would like to deploy servers that meet both the compute intensive and I/O intensive applications. Moreover, in some geographical locations, the preference (or requirement) is that all field replaceable units (referred to as FRUs) be replaced from the front of the system, and all signal and power connectivity be made through the rear of the system. In other markets, all the FRUs as well as signal and power connectivity needs to be made from the front of the system. A further complication arises in this situation, because centrally located devices within the machine (for example midplanes and power filters) are also considered FRUs and must also be replaced from the front or back of the system.

It can thus be readily understood that there is a need for a general purpose server that is rugged, highly available and meets the varying requirements as described above.

SUMMARY OF THE INVENTION

To overcome the limitations described above, and to overcome other limitations that will become apparent upon reading and understanding the present specification, disclosed is a computer system comprising a chassis that houses one or more servers removably mounted in drawers in the computer system. The computer system further includes optional power and signal connectivity to the one or more servers through either the front or the rear of the machine.

Briefly stated, one embodiment of a computer system according to the present invention includes a chassis that houses one or more individual computer servers which reside in drawers or subchassis. The drawers may be half the width of the chassis, or may be one fourth the width of the chassis. The chassis may house one to four of the drawers, in various combinations. The servers further comprise a plurality of field replaceable units which may be accessed and replaced from the front of the server. The drawer that houses the servers includes cable routing brackets and power supply units that allow power to be supplied through the front of the machine. Similarly, a power supply input on the rear of the drawer allows for power to be supplied from the rear of the machine. An internal power filter allows the power supply to operate in either condition. Signal connectivity is made through the front or rear of the drawer, where the drawer mates with a midplane in the chassis.

The server is further comprised of a central processing unit, power supply, storage and fan trays for cooling the machine. The upper portion or upper bay of the drawer includes one or more expansion card slots, which may be compact PCI card slots. The drawers include slide handles which allow the drawers to be slideably installed into the chassis. Most field replaceable units mate into the system midplane and may be serviced or replaced from the front of the machine. Transition cards in the rear of the chassis allow for signal connectivity to these peripheral devices to be made through the rear of the machine.

Accordingly, the computer system of the present invention is suited for the various environments where front or rear cable access may be required. Further, the computer system of the present invention is comprised of a plurality of field replaceable units that follow industry standards, are robust and easy to service. These and other advantages of the present invention will be more readily understood in the following detailed description accompanied by the following drawings.

BRIEF DESCRIPTION OF THE DRAWINGS

Referring now to the drawings, in which like reference numerals represent corresponding parts throughout.

DETAILED DESCRIPTION OF THE PREFERRED EMBODIMENT

Figure 1A:
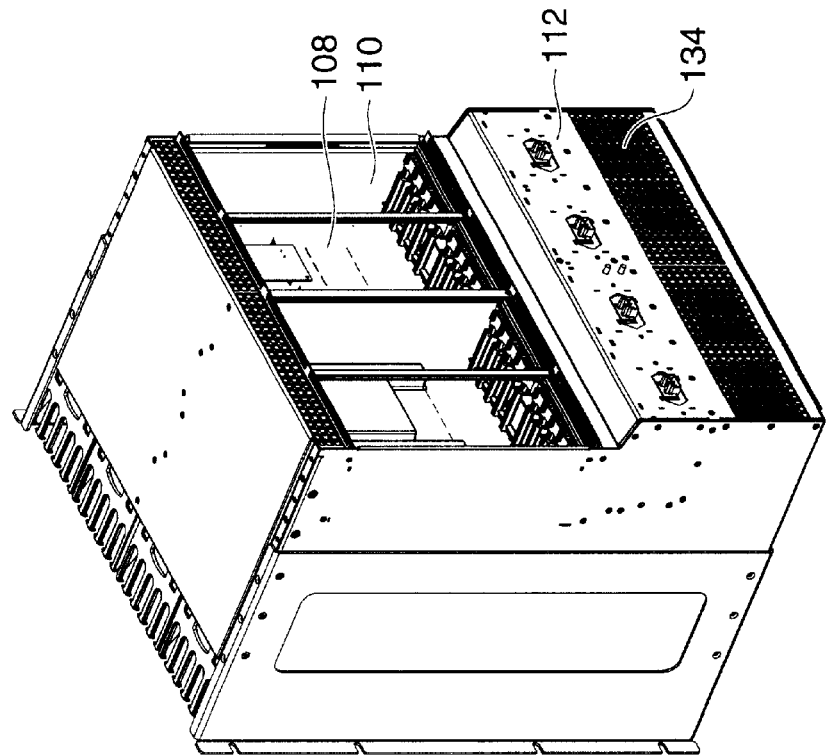
FIG. 1A is a front perspective view of an exemplary computer system according to the present invention and FIG. 1B is a rear perspective view of an exemplary computer system according to the present invention.

FIG. 1A is a front perspective view of an exemplary computer system 100 which is in one embodiment a rack mounted server. Computer system 100 comprises a chassis 106 which houses one or more individual computer systems 102, 104 each housed in a subchassis. Individual computer systems 102, 104 further include power supply 126, expansion card slots 103, 118, 120 and system status display panels 124, 130. Computer system 100 may be a network server located in a data center being remotely monitored and locally serviced. Although this is one exemplary embodiment, it is understood that any computer system having field replaceable units is within the spirit and scope of the present invention.

Figure 1B:
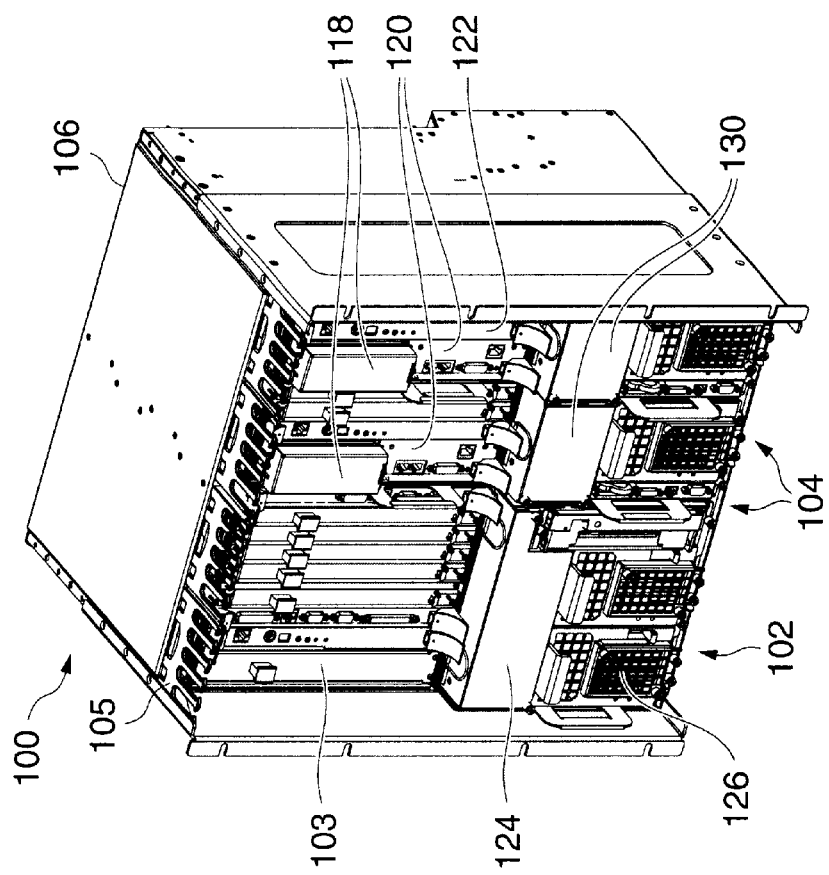

FIG. 1B is a rear perspective view of the computer system of FIG. 1A, showing a rear view of midplane 108, bays for transition cards 110 and power supply inputs 112. Vents for airflow out the rear of the system 100 are shown at 134.

In one embodiment, the computer system of FIG. 1A and 1B comprises a general purpose compact PCI server that allows for optional front or rear signal and power connectivity, and access to all field replaceable units (FRUs) including midplanes and power filters from the front of the server. In this embodiment, the system is comprised of a chassis constructed of several thin gauged sheet metal (16–18 gage for example) parts that are either welded or riveted together. The chassis may be, for example, 533 mm (12U) tall, 450 mm wide and 400 mm deep. Via rack brackets or rack bracket adapters, the chassis can be integrated into standard 19 inch, 600 mm and 23/24 inch racks.

The chassis houses up to four power filters. The power filters allow for power to be connected to a server from the rear of the chassis, or via an internal cable, to the front of the chassis.

Integrated into the rear of the chassis is a 6U cPCI card cage. This card cage accommodates up to 20 rear I/O transition cards. The transition cards allow signal connectivity to be made to the rear of the server. The rear card cage has the plastic card guides that are spaced in such a way to allow the transition cards to align with mating midplane connectors.

The system further includes a five 6U cPCI slot subchassis which will be described in connection with FIG. 4 below. The drawer or subchassis slides in through the front of the chassis. The drawer may be retained in the chassis via a plurality of spring-loaded threaded fasteners that are held permanently captive to the subchassis.

The five slot drawer is separated into two major segments or bays. The upper bay consists of a five slot 6U cPCI card cage that adheres to cPCI standards. This card cage can accommodate five 6U cPCI cards, or three 6U cPCI cards, one 3½ inch hard disk drive (HDD) and two 3U cPCI cards. In the three cPCI configuration, the HDD is located to the side of the 6U cPCI cards, and the 3U cPCI cards are located below the HDD.

The lower bay can accommodate one 350 watt DC or AC power supply, two fan tray assemblies, one CPU front transition module (FTM) one system controller board (SCB) and one LED indicator assembly. All components located in the lower bay mate into a midplane. All components in the drawer with the exception of the HDD, CPU and FTM can be removed from the system and installed in the system without turning off the power to the system and without interrupting the service supplied by the server.

The midplane is located on the rear of the drawer and is secured to the drawer with several threaded fasteners. In the case of midplane failure, it can be repaired by removing all of the cPCI cards and FRUs from the drawer, removing the midplane/drawer assembly from the chassis, installing a new drawer/midplane assembly and replacing the FRUs and cPCI cards.

All components in the drawers or subchassis are positioned to allow the I/O cables from the cPCI or FTM to be routed either above or below the drawer without these I/O cables obstructing the removal or replacement of any FRU or cPCI card.

An eight 6U cPCI slot subchassis or drawer, as will be described in connection with FIG. 2, also functions in a similar fashion to the five slot drawer. To one side of the 6U cPCI cards are a pair of 3½ HDDs. These HDDs blind mate directly into the midplane.

The lower bay can accommodate two 350 watt AC or DC power supplies, one removable media module (RMM), one SCB, two fan trays and one LED indicator panel assembly. The RMM can accommodate any standard 5¼ half height (1.6 inch) device. The device includes, but is not limited to, CD-ROMs, DAT Tape drives, 8 mm tape drives, DVD drives. The RMM allows the above devices to be blind mated into the midplane.

In general, the server is cooled by drawing in room ambient air from the lower front of the system and exhausting the air from the lower of the upper rear of the system.

A system that would require signal connectivity to the rear of the server would use the cPCI transition cards as previously described. To make signal connections to the front of the system, the I/O connections on the 6U cPCI cards in the drawers are used. Front access power connections are located in the chassis, just above the drawers.

The chassis can accommodate four 5-slot drawers or two 8-slot drawers, or one 8-slot drawer and two 5-slot drawers or any subset of the above. A system such as the one described above in connection with FIGS. 1A and 1B may be a Netra™ ct 400 or 800 servers such as those available from Sun Microsystems®.

Figure 2:
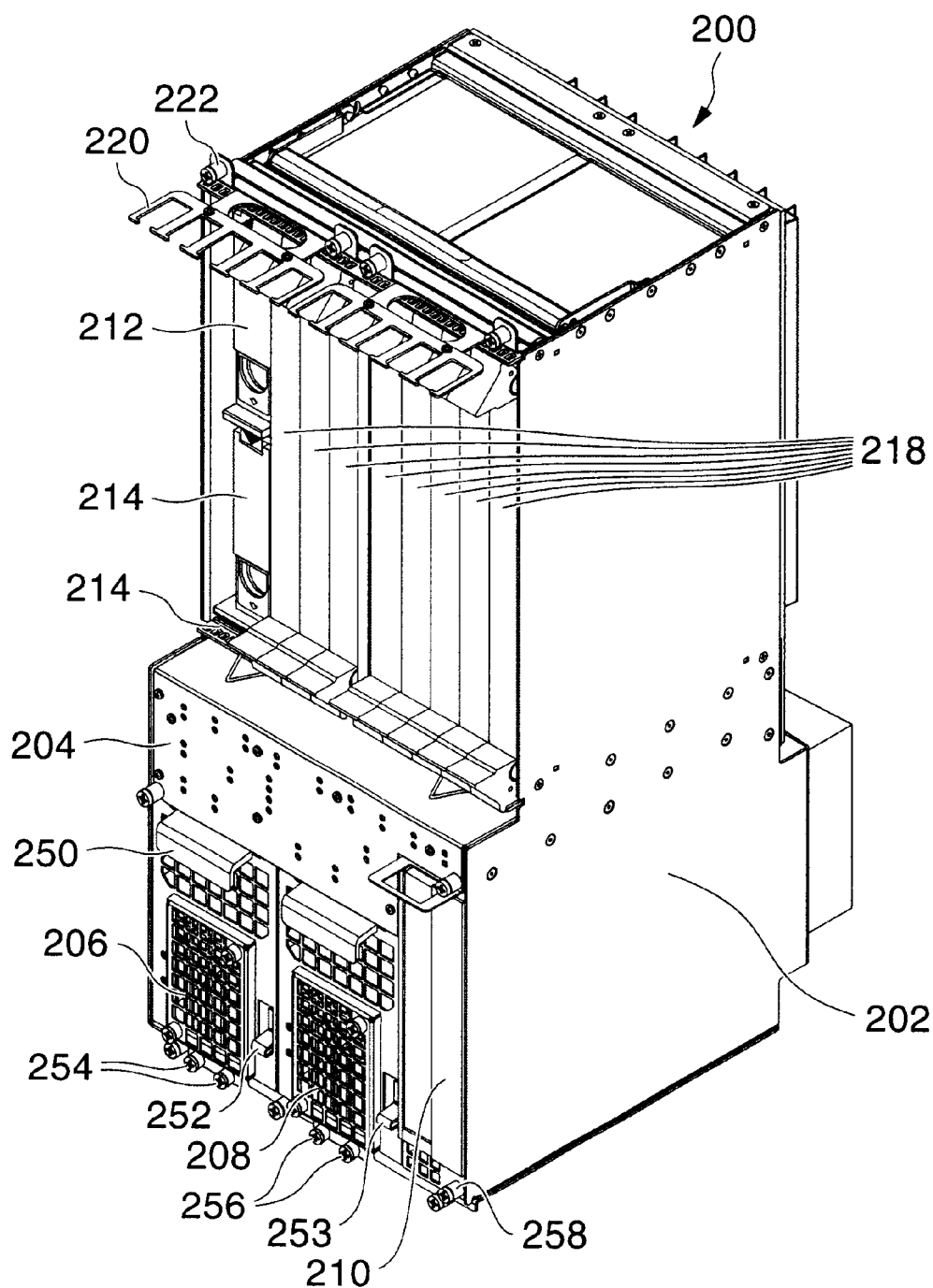
FIG. 2 is a perspective view of one embodiment of computer system according to the present invention.

FIG. 2 shows one embodiment of of a computer system having field replaceable units. Computer system 200 is comprised of a drawer assembly or subchassis 202, which is removably installed within a chassis (not shown). Computer system 200 further includes a system display panel 204 which itself is a field replaceable unit, and will further be described below in connection with FIG. 3. Behind the system display panel 204 are located two fan trays and system control board which are not shown, but will be shown in connection with FIG. 3 Computer system 200 has two power supplies represented by 206 and 208. Each of the power supplies 206 and 208 are field replaceable units. Power supplies may be for example DC or AC power supplies. Computer system 200 may also comprise one or more mass storage devices. For example, system may include a removable media module 210, and one or more hard disk drive assemblies, 212 and 214. One or more expansion slots 218 which all are adapted to support field replaceable expansion cards. Examples of expansion cards include network interface controllers, such as ethernet and fast ethernet, system alarm cards, and CPU cards. These cards may all be compliant with the Compact PCI standard and may be hot swappable. An exemplary system such as the one shown in FIG. 2 may be the Netra® ct800 by Sun Microsystems®. An exemplary system may be certified to meet or exceed the Network Equipment Building System (NEBS) Level 3 standard as defined by Bellcore and ETSI.

Figure 3:
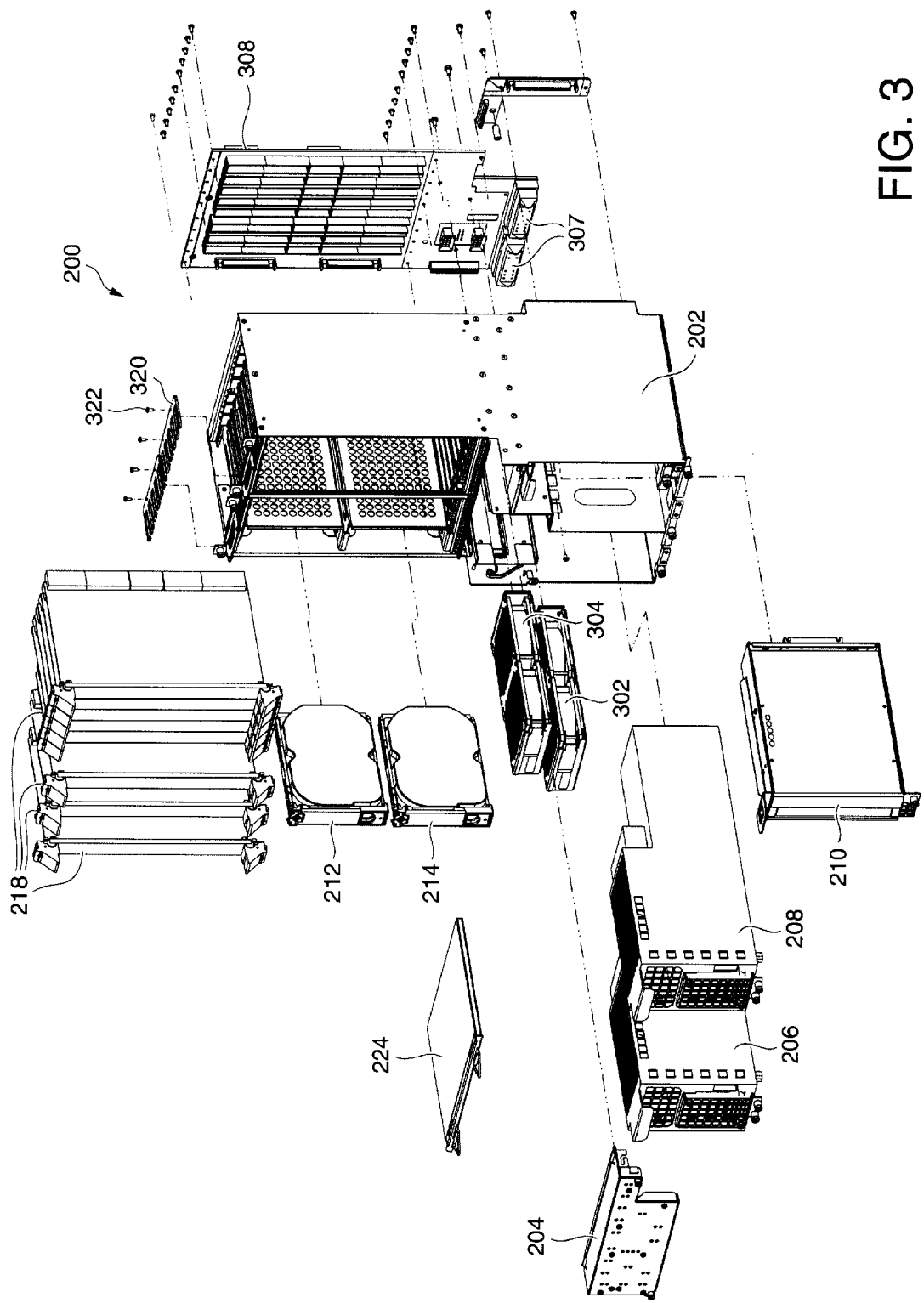
FIG. 3 is an exploded view of computer system shown in FIG. 2, showing the location of various field replaceable units.

FIG. 3 shows an exploded view of the computer system 200 shown in FIG. 2. As seen in FIG. 3, all the components within the subchassis 202 are field replaceable units that connect in the system through the midplane (or backplane) 308. Transition cards (not shown) are installed into the backside of midplane 308. The location and status of these components is found on a centralized system display panel 204. FIG. 3 further shows that the various field replaceable units plug into midplane 308. FIG. 3 further shows a pair of fan trays 302 and 304, cable routing bracket 320 and chassis attachment screws 322.

Figure 4:
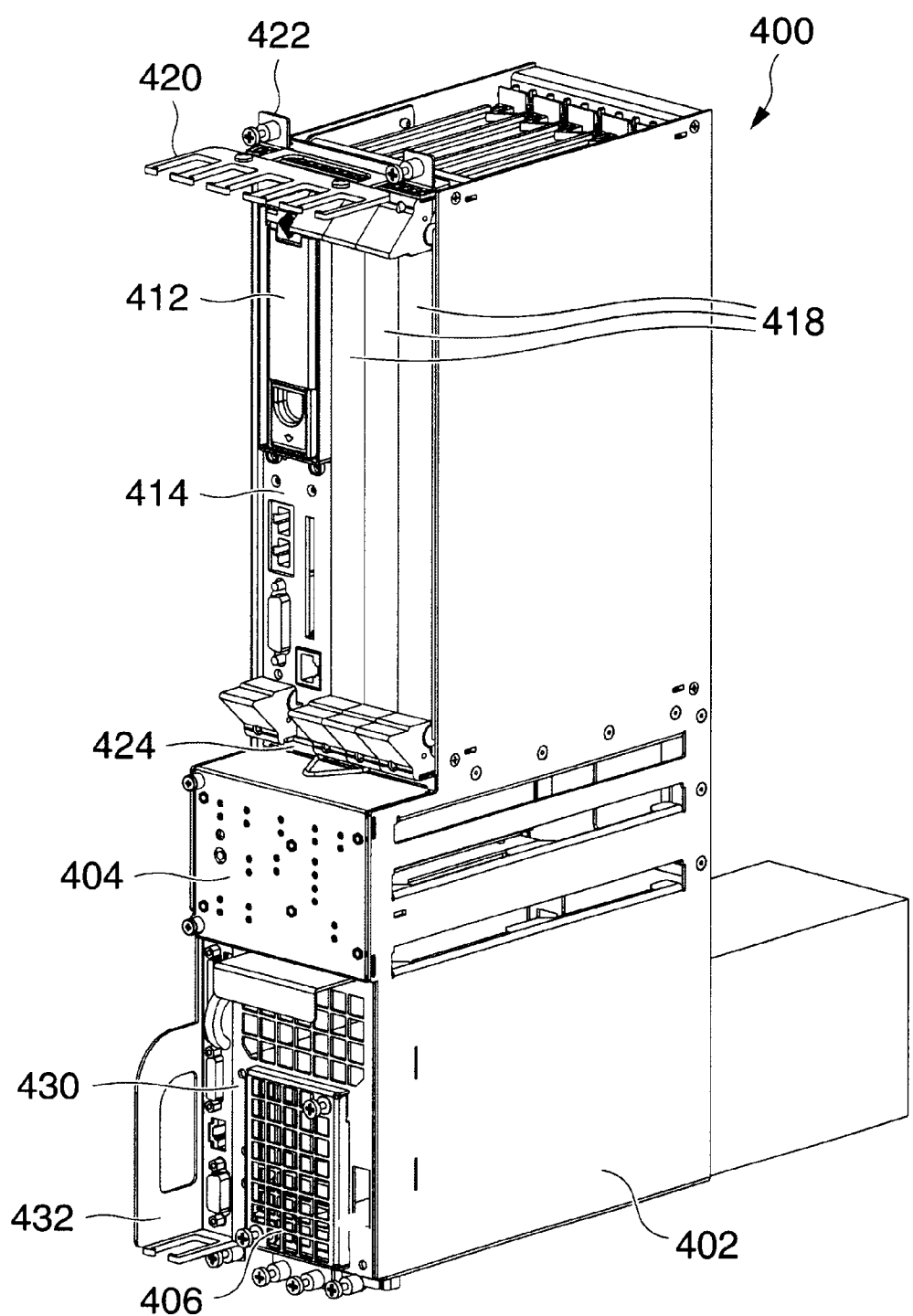
FIG. 4 is a perspective view of another embodiment of the computer system according to the present invention.

FIG. 4 illustrates a second example of a computer system according to the present invention. Computer system 400 is comprised of a drawer assembly 402, which is removably installed within a chassis (not shown). Computer system 400 further includes a system display panel 404 which itself is a field replaceable unit, and will further be described below in connection with FIG. 5. Behind the system display panel 404 are located two fan trays and system control board which are not shown, but will be shown in connection with FIG. 5 Computer system 400 has a power supply represented by 406. The power supply 406 is a field replaceable unit and may be, for example, a DC or AC power supply. Computer system 400 may also comprise one or more mass storage devices such as a disk drive assembly 412. One or more expansion slots 418 which all are adapted to support field replaceable expansion cards. Examples of expansion cards include network interface controllers such as ethernet and fast ethernet, system alarm cards, and CPU cards. These cards may all be compliant with the Compact PCI standard. An exemplary system such as the one shown in FIG. 4 may be the Netra® ct400 by Sun Microsystems®. An exemplary system may be certified to meet or exceed the Network Equipment Building System (NEBS) Level 3 standard as defined by Bellcore and ETSI.

Figure 5:
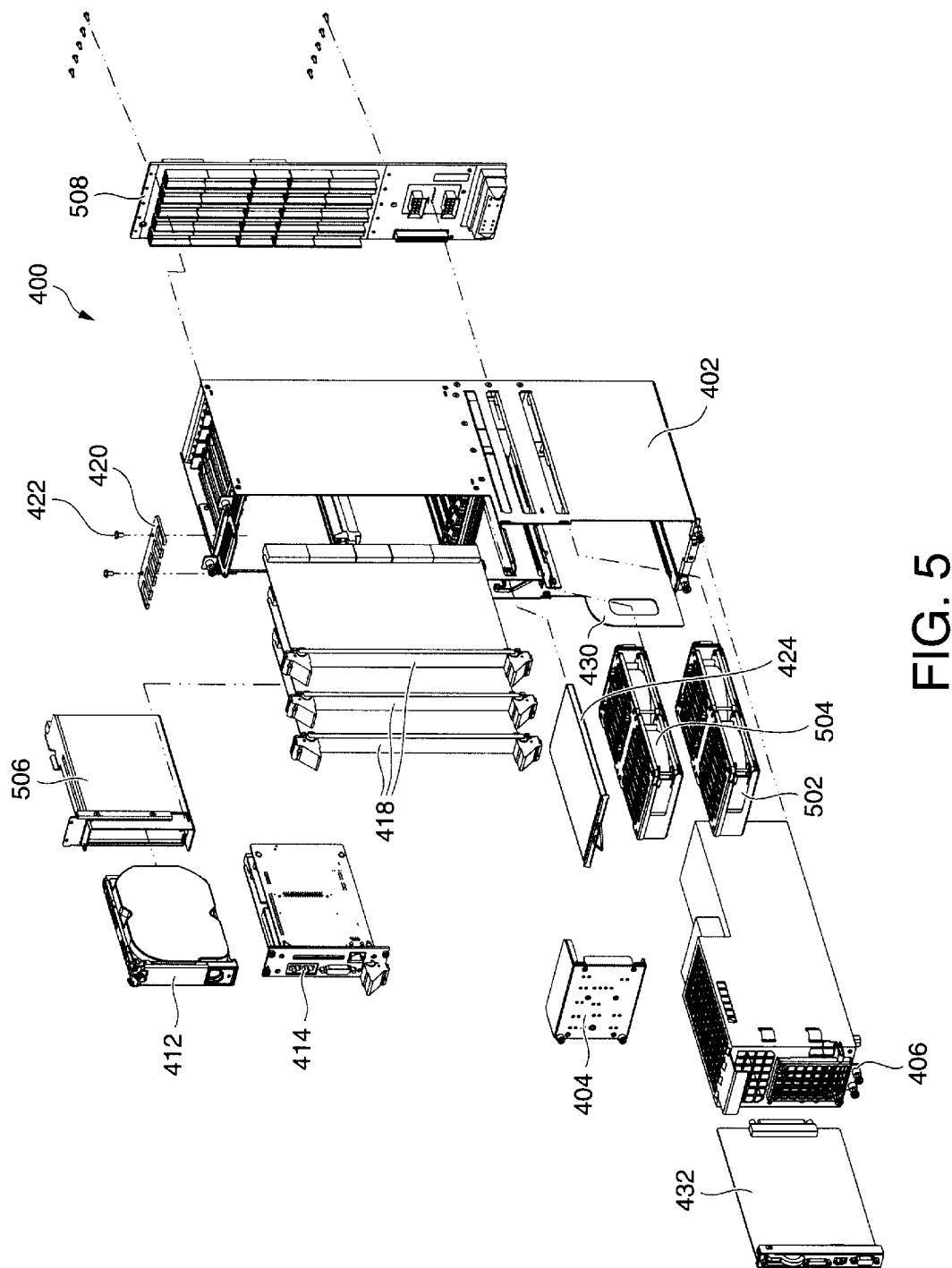
FIG. 5 is an exploded view of the computer system shown in FIG. 4, showing the location of various field replaceable units.

FIG. 5 is an exploded view of the computer system shown in FIG. 4. As seen in connection with FIG. 5, all the components in the system 400 are field replaceable units. As indicated above, the location and status of these components is found on centralized system display panel 404. FIG. 5 further shows that the various field replaceable units plug into midplane 508. FIG. 5 further shows mount bracket 506 which is selectively used on an expansion slot to support disk drive 412, allowing it to blind mate into the midplane 508.

Figure 6:
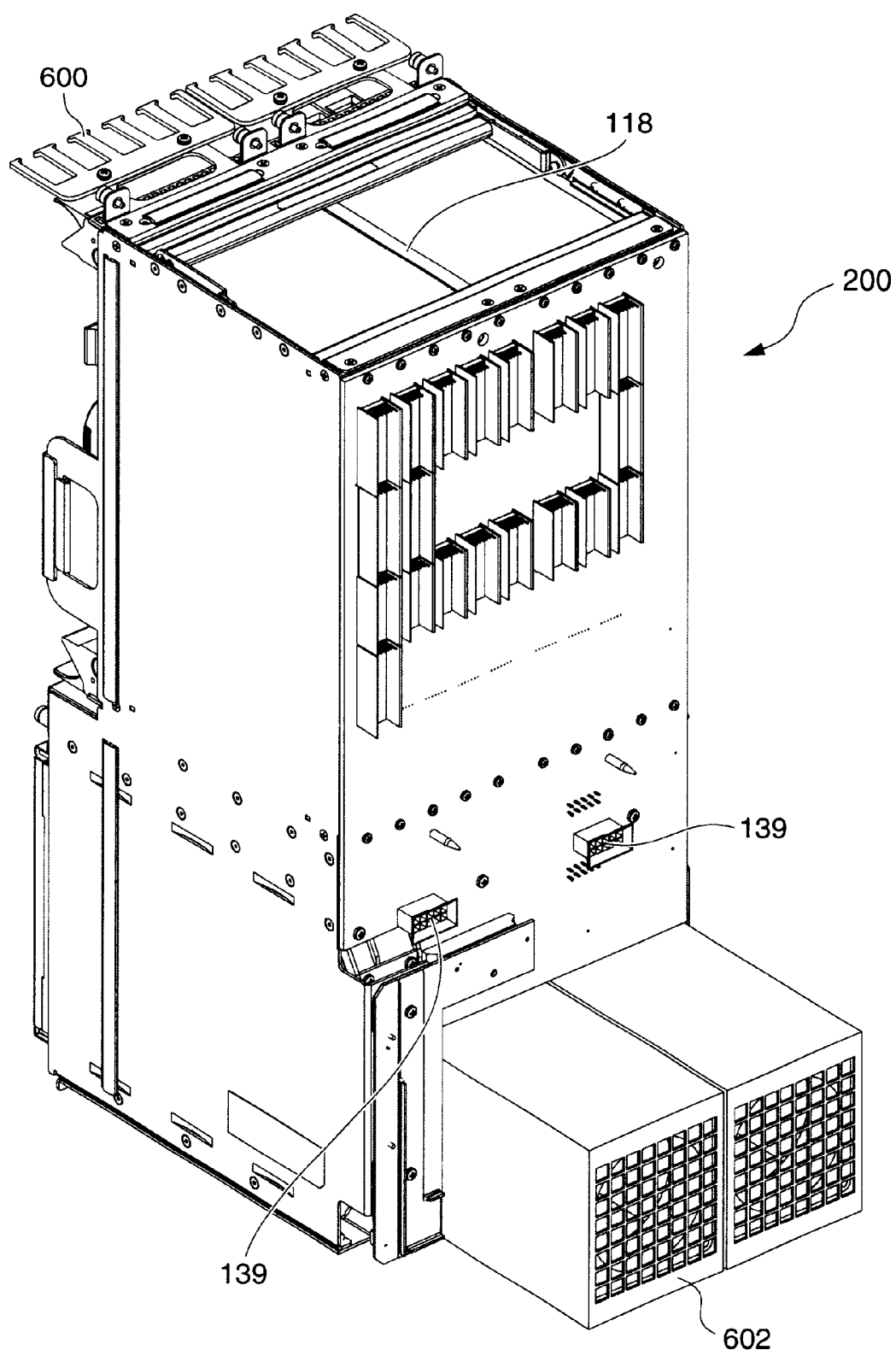
FIG. 6 is a rear perspective view of the embodiment of the computer system of the present invention shown in FIG. 2.

FIG. 6 is a rear view of the server system 200 shown in FIG. 2 and installable into the chassis 106 of the computer system of the present invention. FIG. 6 shows cable routing brackets 600. The drawer or subchassis 200 further shows power filters 139 which mate with power supply inputs in the rear of the computer system 100. Rear portion of power supplies 602 fits into the chassis 106 and abuts with rear vents 134 shown in FIG. 1.

Figure 7:
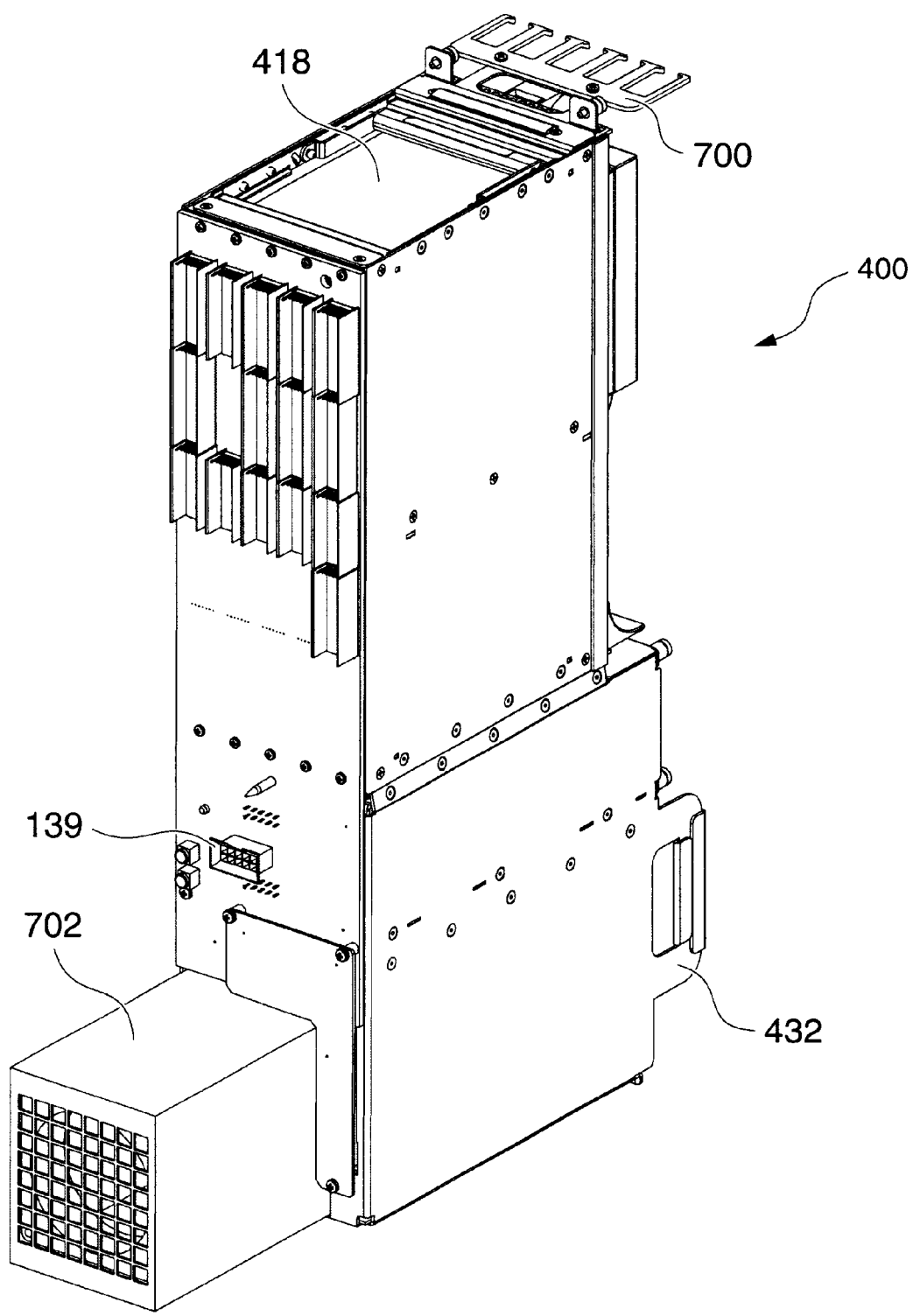
FIG. 7 is a rear perspective view of the embodiment of the computer system of the present invention shown in FIG. 4.

FIG. 7 is a rear view of the server system 400 shown in FIG. 4, and installable into the chassis 106 of the computer system of the present invention. FIG. 7 also shows cable routing brackets 700. The drawer 400 or subchassis further shows power filters 139 which mate with power supply inputs in the rear of the computer system 100. Rear portion of power supplies 702 fit into the chassis 106 and abuts vents 134 shown in FIG. 1.

The foregoing description of the preferred embodiment has been presented for the purposes of illustration and description. It is not intended to be exhaustive or to limit the invention to the precise form disclosed. Many modifications and variations are possible in light of the above teachings. It is intended that the scope of the invention be limited not with this detailed description, but rather by the claims appended hereto.

What is claimed is:

1. A computer system comprising:
   a chassis; and
   at least one server system housed in a subchassis removably installed in the chassis, the server system comprising a plurality of field replaceable units removable from the front of the chassis;
   wherein power supplied to the server system may be selectably made through either the front or the rear of the chassis.

2. The computer system of claim 1, wherein the width of the subchassis is one half the width of the chassis.

3. The computer system of claim 1, wherein the width of the subchassis is one fourth the width of the chassis.

4. The computer system of claim 1, wherein the subchassis is comprised of a power supply, a processing unit and a plurality of expansion card slots.

5. The computer system of claim 1, further comprising:
   cable routing brackets located on the chassis; and
   a power supply input on the front portion of the subchassis to allow power to be connected through the front of the subchassis.

6. The computer system of claim 1, further comprising a power supply input on the rear of the chassis to allow power to be supplied from the rear of the subchassis.

7. The computer system of claim 1, wherein the chassis comprises:
   a front signal connector configured to provide signal connectivity to the server system at the front of the chassis; and
   a rear signal connector configured to provide signal connectivity to the server system at the rear of the chassis.

8. The computer system of claim 4, wherein the expansion card slots are compact PCI card slots.

9. The computer system of claim 8, wherein the chassis further comprises a midplane and the expansion card slots mate with connectors on a midplane.

10. The computer system of claim 7, wherein the rear signal connector comprises one or more card connectors configured to receive input/output transition cards.

11. A computer system housed in a subchassis comprising:
an upper bay; and
a lower bay,
said upper bay further comprising a plurality of expansion card slots;
said lower bay further comprising a power supply, fan trays, a system controller board and a status indicator assembly;
wherein said subchassis is removably mounted into a rack mountable chassis and where expansion cards for the expansion card slots, the fan trays and status indicator are all field replaceable from the front of the subchassis.

12. The computer system of claim 11, wherein power input to the power supply unit connects through the front of the chassis.

13. The computer system of claim 11, wherein power input to the power supply unit connects through the rear of the chassis.

14. The computer system of claim 11, wherein components in the lower bay of the subchassis mate with a midplane in the chassis.

15. The computer system of claim 11, wherein the chassis further comprises a rear card cage, adapted for supporting rear transition cards.

16. The computer system of claim 11, further including a subchassis handle to allow for the subchassis to be slideably installed into the chassis.

17. The computer system of claim 14, wherein the midplane is a field replaceable unit.

18. The computer system of claim 15, wherein the rear card cage further includes guide rails spaced to allow for rear transition cards aligning with midplane connectors.

19. A computer system comprising:
a chassis;
a plurality of subchassis, each housing a server, each of said subchassis being insertable into said chassis;
wherein each of said subchassis further comprises:
an upper bay;
a lower bay; and
a plurality of field replaceable components;
wherein connectivity to said field replaceable units is established through a midplane mating with a rear card cage in the chassis.

20. The computer system of claim 19, wherein power input to each of said subchassis is located in the front of said subchassis.

21. The computer system of claim 19, wherein power input to each of said subchassis is located in the rear of said subchassis.

22. A computer chassis configured to include a plurality of subchassis, each said subchassis comprising:
one or more computer servers;
a power supply;
a front power input configured to feed external power to the power supply from the front of said subchassis;
a rear power input configured to feed external power to the power supply from the rear of said subchassis;
a power filter for filtering power received through whichever of the front power input and the rear power input is used to supply power to said subchassis.

23. The computer chassis of claim 22, wherein each said subchassis further comprises:
a plurality of expansion card slots.

24. The computer chassis of claim 22, wherein each said subchassis further comprises:
a set of input/output connectors configured to interface with data links at the front of said subchassis; and
a set of connectors configured to receive input/output transition cards configured to interface with data links at the rear of said subchassis.

25. The computer chassis of claim 22, wherein each said subchassis further comprises:
one or more fan trays field replaceable through the front of said subchassis.

26. A computer system, comprising:
a chassis;
at least one server system housed in a subchassis removably installed in the chassis;
a power supply input at the rear of the chassis to allow power to be supplied through the rear of the subchassis; and
a power supply input at the front of the chassis to allow power to be supplied through the front of the subchassis;
wherein power supplied to the server system may be selectably made through either the front or the rear of the chassis.

27. The computer system of claim 26, wherein the subchassis comprises:
a power supply;
a processing unit; and
a plurality of expansion card slots.

28. The computer system of claim 26, wherein the chassis further comprises a midplane and the expansion card slots mate with connectors on a midplane.

29. The computer system of claim 26, wherein the server system further comprises a plurality of field replaceable units removable from the front of the chassis.

30. The computer system of claim 26, further comprising:
cable routing brackets located on the chassis; and
a power supply input on the front portion of the subchassis to allow power to be connected through the front of the subchassis.

31. A computer chassis configured to include a plurality of subchassis, each said subchassis comprising:
one or more computer servers;
a power supply;
a front power input configured to feed external power to the power supply from the front of said subchassis;
a rear power input configured to feed external power to the power supply from the rear of said subchassis; and
one or more fan trays field replaceable through the front of said subchassis or rear of said subchassis.

32. The computer chassis of claim 31, wherein each said subchassis further comprises:
a plurality of expansion card slots.

33. The computer chassis of claim 31, wherein each said subchassis further comprises:

a power filter for filtering power received through whichever of the front power input and the rear power input is used to supply power to said subchassis.

34. The computer chassis of claim 31, wherein each said subchassis further comprises:

a set of input/output connectors configured to interface with data links at the front of said subchassis; and a set of connectors configured to receive input/output transition cards configured to interface with data links at the rear of said subchassis.

* * * * *